(12) United States Patent
Jensen et al.

(10) Patent No.: US 7,841,143 B2
(45) Date of Patent: Nov. 30, 2010

(54) TOWER CONSTRUCTION

(75) Inventors: Søren Poul Jensen, Varde (DK); Karsten Dal, Varde (DK); Borge Ollgaard, Esbjerg (DK)

(73) Assignee: Vestas Wind Systems A/S, Randers SV (DK)

( * ) Notice: Subject to any disclaimer, the term of this patent is extended or adjusted under 35 U.S.C. 154(b) by 42 days.

(21) Appl. No.: 12/307,058

(22) PCT Filed: Jul. 5, 2007

(86) PCT No.: PCT/EP2007/056816

§ 371 (c)(1),
(2), (4) Date: Mar. 25, 2009

(87) PCT Pub. No.: WO2008/003749

PCT Pub. Date: Jan. 10, 2008

(65) Prior Publication Data

US 2009/0282774 A1 Nov. 19, 2009

(30) Foreign Application Priority Data

Jul. 5, 2006 (DK) ............................... 2006 00926
Jul. 5, 2006 (DK) ............................... 2006 00927

(51) Int. Cl.
*E02D 27/00* (2006.01)

(52) U.S. Cl. ..................... 52/296; 52/167.7; 52/126.6

(58) Field of Classification Search ............... 52/167.7, 52/296, 126.3, 126.6, 295
See application file for complete search history.

(56) References Cited

U.S. PATENT DOCUMENTS

| 5,379,563 | A | 1/1995 | Tinsley |
| 5,586,417 | A | 12/1996 | Henderson et al. |
| 5,826,387 | A | 10/1998 | Henderson et al. |

FOREIGN PATENT DOCUMENTS

| DE | 10045735 | 3/2002 |
| DE | 10105472 | 8/2002 |
| DE | 10226996 | 4/2003 |
| DE | 102004031655 | 2/2006 |
| FR | 2477198 | 9/1981 |
| FR | 2682982 | 4/1993 |
| JP | 59150830 | 8/1984 |
| JP | 08209721 | 8/1996 |

*Primary Examiner*—Basil Katcheves
(74) *Attorney, Agent, or Firm*—Cohen Pontani Lieberman & Pavane LLP (57) ABSTRACT

The invention provides a tower construction e.g. for a wind mill and a method of laying a foundation of a tower construction. The tower construction (1) comprises a concrete element (2), and a base flange (3) from which a tower wall (4) extends upwardly. The base flange is supported by an intermediate support structure (5) positioned on the concrete element (2). The support structure (5) is more rigid than the concrete element (2) and comprises a resilient pressure distributing element (6) which is soft relative to the concrete element (2). Furthermore, the invention provides a support structure for a tower construction.

15 Claims, 9 Drawing Sheets

TOWER CONSTRUCTION

PRIORITY CLAIM

This is a U.S. national stage of application No. PCT/EP2007/056816, filed on Jul. 5, 2007. Priority is claimed on the following application(s): Country: Denmark, Application No. PA200600926, Filed: Jul. 5, 2006; and Country: Denmark, Application No. PA200600927, Filed: Jul. 5, 2006, the contents of which are incorporated here by reference.

THE FIELD OF THE INVENTION

The present invention relates to a tower construction e.g. for a wind turbine and a method for laying a foundation of a tower construction. Furthermore, the invention relates to a support structure for use in connection with a tower construction, and a wind turbine.

BACKGROUND OF THE INVENTION

When laying a foundation of a tower construction such as a wind turbine, a reinforced concrete element is often cast and subsequently, the turbine tower is positioned on the concrete element and fixed hereto. A simple way of fixing the tower to the concrete element is to anchor substantially vertical anchor rods in the concrete element, and attach these to a flange being attached to the tower wall.

U.S. Pat. No. 5,586,417 discloses an example of such a tower construction. The foundation is formed within a ground pit and externally and internally back filled. The lower end of the foundation has a circumferential ring fully embedded therein and sets of inner and outer circumferentially spaced bolts have their lower ends anchored to the anchor ring, their upper ends projecting up outwardly of the top of the foundation and a majority of the midportions thereof free of connection with the cementitious material of which the foundation is constructed. The base flange of a tubular tower is positioned downwardly upon the upper end of the foundation with the upper ends of the inner and outer sets of bolts projecting upwardly through holes provided therefore in the base flange and nuts are threaded downwardly upon the upper ends of the bolts and against the base flange. The nuts are highly torqued in order to place the bolts in heavy tension and to thus place substantially the entire length of the cylindrical foundation in heavy axial compression.

Due to the heavy weight of the tower construction, the anchor rods and the concrete element will be exposed to a large pressure at points carrying the tower. The anchor rods tend to bend as a consequence hereof, though being kept approximately in position by the concrete element. When the turbine tower is in position, bolts attached to the anchor rods are tightened to provide tension on the anchor rods, thereby post-stressing the concrete element in great compression and leaving the anchor rods in static tension. Even though the foundation is leveled before positioning the turbine tower, a large pressure is put on the anchor rods when positioning the tower.

SUMMARY OF THE INVENTION

It is an object of embodiments of the present invention to provide an improved tower construction, an improved method of laying a foundation of a tower construction and to provide a support structure for a tower construction.

In a first aspect, the invention provides a tower construction comprising a concrete element, a base flange comprising a lower surface and an opposite upper surface from which a tower wall extends upwardly, the base flange being supported by an intermediate support structure positioned on the concrete element, the support structure being more rigid than the concrete element, wherein the support structure comprises a resilient pressure distributing element which is soft relative to the concrete element.

By more rigid is in this context meant, that the support structure will deform less than the concrete element, when an equal pressure is applied on each of these elements. On the contrary, an element which is soft relative to another is defined as an element deforming more, when being exposed to an equal pressure.

Due to the resilient pressure distributing element of the support structure, the pressure from the tower on the concrete element is distributed over a larger area, thereby reducing the pressure on the points at which the tower is carried, whereby the concrete element is exposed to less stress.

The tower construction may comprise traditionally tapered round tower sections mounted on top of each other. Each tower section may be made of a steel plate rolled into shape and assembled by welding of opposite free ends thereby constituting a closed ring. Alternatively, each section may be formed by a number of plates being assembled to form a tower section. The tower may be also be made without using tower sections, e.g. the tower may be assembled by a number of plates having the height of the final tower. Other types of towers may also be used, these towers having a tower wall extending upwardly from a base flange.

The concrete element may be cast in a pit in the ground and may comprise a steel reinforcement. A groove may be formed in an upper mounting plane of the concrete element, in which groove the intermediate support structure may be positioned. Alternatively, the intermediately support structure may be positioned at the upper mounting plane.

The support structure is more rigid than the concrete element, thereby deforming less than the concrete element, when an equal pressure is applied on each of these elements. This may be achieved by partly constructing the support structure of e.g. steel.

The support structure comprises a resilient pressure distributing element which is soft relative to the concrete element, i.e. the pressure distributing element deforms at a lower pressure than the concrete element. This may be achieved by including a layer of synthetic materiel e.g. plastic in the pressure distributing element.

Furthermore, the support structure may comprise a levelling structure in order to be able to level the base flange relative to the concrete element. If the upper mounting plane of the concrete element is not horizontal, the pressure exposed on the concrete element will be uneven and the tower may be out of plumb when positioned on the concrete element. The levelling structure may be located between the lower surface of the base flange and the pressure distributing element, in order to secure a substantially horizontal positioning surface for the base flange.

In order to increase the ability of the support structure of distributing the applied pressure, the support structure may further comprise an additional pressure distributing structure.

In one embodiment, the additional pressure distributing structure comprises a plurality of pressure distributing plates and a plurality of spring structures. The spring structures may be provided to bias the pressure distributing plates towards the base flange. The pressure distributing plates may in combination substantially form an annular member which equals the form of the base flange. However, the inner and outer diameter of the ring being defined by the pressure distributing plates may be different form the inner and outer diameter of the base flange. The spring structures may be disc springs or helically coiled springs or other elastically deformable structures.

The additional pressure distributing structure may comprise an arbitrary number of pressure distributing plates, e.g. 2, 3, 4, 6 or 8 plates. Likewise the number of spring structures may be chosen arbitrarily. A number of three spring structures per pressure distributing plate may facilitate biasing of the plates towards the base flange. The pressure distributing plates and the spring structures may preferably be made of steel.

When positioning the base flange on the support structure, the support structure is exposed to a pressure. A second casting layer may be provided in order to distribute the pressure on the support structure on the concrete element. The second casting layer may be located between the concrete element and the base flange. If a groove is formed in the upper mounting plane of the concrete element, the second casting layer may be cast in this groove.

In order to allow for an even distribution of the pressure to which the support structure is exposed, the rigidity of the combination of the resilient pressure distributing element and the levelling structure may be in the range of the rigidity of the second casting layer, i.e. the combination of the resilient pressure distributing element and the levelling structure and the second casting layer deform at approximately equal pressures. This further allows for casting of the second casting layer in one work sequence, due to the fact that the combination of the resilient pressure distributing element and the levelling structure may remain within the second casting layer when casting this, without resulting in points with a high concentration of stress.

As an example, the second casting layer may have an E-module in the range of 35,000-70,000 N/mm$^2$, whereas steel has an E-module in the range of 210,000 N/mm$^2$. Since the levelling structure in some embodiments may be made of steel, the combination of the resilient pressure distributing element, which may be made of a synthetic material, and the levelling structure may made so that the E-module hereof is also in the range of 35,000-70,000 N/mm$^2$.

The levelling structure may comprise a plurality of wedges, the wedges being provided to adjust the distance between the concrete element and the base flange. In one embodiment, the levelling structure may comprise two steel wedges positioned on top of each other, so that a direction from a blunt end to a pointed end of one wedge is opposite to that of the other wedge. This allows sliding of the wedges relative to each other until the required height of the support structure is achieved. The levelling structure may further comprise a steel base and a steel top being attachable to each other, thereby being able to lock the wedges together when adjusted to the required height. Other materials allowing for a rigidity of the support structure in the range of rigidity of the second casting layer may also be used.

In another embodiment of the present invention, the levelling structure may comprise at least two telescopically arranged carrier rods, the rods being provided to adjust the distance between the concrete element and the base flange. The carrier rods may comprise a locking element in order to lock the carrier rods when the support structure is adjusted to the required height. A base and a top may also be provided in order to protect the carrier rods.

The support structure may comprise a plurality of support elements which have a height being individually adjustable, thereby allowing for easy levelling of the base flange. Each height adjustable support element may comprise an individual resilient pressure distributing element and an individual levelling structure. In one embodiment, the support structure comprises three individually height adjustable support elements. This may facilitate distribution of the pressure applied to the support structure and may facilitate levelling of the base flange and thus levelling of the tower.

The concrete element may comprise a plurality of anchor rods and an anchor ring. The anchor rods may be elongated high strength steel rods being substantially vertically arranged in the concrete element, and may be spaced about the centre of the concrete element. The anchor ring may be a steel flange comprising a plurality of through holes which enable connection of the anchor rods to the anchor ring. The anchor ring may be positioned near the bottom of the concrete element, thus the anchor ring may be connected to a lower end of the anchor rods. The lower part of the anchor rods may be threaded and the connection of the anchor rods to the anchor ring may be secured by attaching a nut to each of the anchor rods below the anchor ring. An upper section of the anchor rods may extend through the upper mounting plane of the concrete element.

In one embodiment, the anchor rods are spaced in pairs side-by-side forming two rings about the centre of the concrete element, the inner ring of the anchor rods having a slightly shorter diameter than the outer ring of the anchor rods. In this embodiment, the anchor ring comprises two sets of though holes spaced about the centre of the anchor ring, these through holes forming two rings. Another embodiment comprises four sets of anchor rods spaced side-by-side forming four rings about the centre of the concrete element, the anchor ring comprising a number of through holes which equals the number of anchor rods. Alternatively, another number of anchor rods may be applied allowing for another configuration of the anchor rods and the anchor ring. In a simple embodiment, the anchor rods may thus form only one ring about the centre of the concrete element.

The anchor rods may comprise a surface treatment which allows for tensioning the anchor rods with substantially no frictional forces affecting the concrete element. The surface treatment may be in the form of a coating or a casing. As an example, the anchor rods may be covered with hollow tubes of e.g. plastic, wrapped in plastic tape or coated with a suitable lubrication allowing the anchor rods to stretch under tension essentially without interacting with the concrete element.

In order to fixate the tower wall, the base flange may comprise a plurality of through holes extending from the upper to the lower surface. Thus when positioning a tower wall, the anchor rods may extend through the holes. In one embodiment, the inner ring of the anchor rods extends through holes in the base flange and into an inner space of the tower, whereas the outer ring of the anchor rods extends through holes in the base flange and into a space outside the tower. When one ring of the anchor rods extends in the inner space of the tower and the other ring extends in the space outside the tower, torque resulting from the tower on the concrete element can be reduced.

In an embodiment comprising anchor rods defining only one ring, the anchor rods may e.g. extend in the inner space of the tower.

The upper part of the anchor rods may be threaded allowing for attachment of a nut thereto. Subsequent to positioning the tower wall, it may be fixated by e.g. attaching a nut to each of the anchor rods above the base flange, thereby applying tension on the anchor rods.

The tower construction may further comprise a shield surrounding an upper portion of the concrete element, the shield being provided to apply a substantially horizontal pressure on the concrete element, i.e. a pressure essentially directed from the periphery of the concrete element towards the centre of the concrete element. When positioning the base flange on the support structure, a pressure is applied on the concrete element which may be protected against cracking by this shield.

Furthermore, when applying tension on the anchor rods, a substantially vertical pressure is applied on the concrete element which consequently may expand horizontally, and thereby be radially deformed. By applying a horizontal pressure radially on the concrete element, the deformation may be avoided, and substantially all stress to the concrete element may be compressive stress. This also has the advantage, that cracking of the concrete element may be avoided or substantially reduced.

It should be understood, that the shield may be applicable for other types of concrete foundations too. As an example, the shield may further be applied in a foundation which does not comprise an intermediate support structure.

In a second aspect, the invention provides a support structure for a tower construction according to the first aspect of the invention, the support structure being more rigid than the concrete element, wherein the support structure comprises a resilient pressure distributing element which is soft relative to the concrete element.

It should be understood, that the above-mentioned features of the first aspect of the invention may also be applicable to the support structure of the second aspect of the invention.

In a third aspect, the invention provides a method of laying a foundation of a tower construction which comprises a base flange with a lower surface and an opposite upper surface, from which a tower wall extends upwardly, the method comprising the steps of casting a concrete element, providing an intermediate support structure being more rigid than the concrete element, the support structure comprising a resilient pressure distributing element which is soft relative to the concrete element, arranging the support structure on an upper mounting plane of the concrete element, lowering the base flange onto the support structure, and fixating the base flange to the concrete element.

It should be understood, that the above-mentioned features of the first and second aspect of the invention may also be applicable to the method of the third aspect of the invention.

When lowering the base flange onto the support structure, the support structure is exposed to a pressure. Therefore, the method may comprise a step of arranging a second casting layer between the concrete element and the base flange, the second casting layer being provided in order to distribute the pressure on the support structure to the concrete element. If a groove is formed in the upper mounting plane of the concrete element, the second casting layer may be cast in this groove.

The second casting layer may be cast before fixating the base flange to the concrete element, thus allowing for an even distribution of the pressure to which the support structure is exposed, when fixating the base flange.

The second casting layer may be cast in one work sequence, due to the fact that the support structure may be left within the second casting layer when casting this, without resulting in points with a high concentration of stress. Removal of the support structure and subsequent casting in cavities which may occur after such a removal are therefore unnecessary.

The concrete element may comprise a plurality of anchor rods, and the step of fixating the base flange to the concrete element may therefore comprise a step of applying tension on the anchor rods. The base flange may comprise a plurality of through holes extending from the upper to the lower surface, through which holes the anchor rods may extend. The upper part of the anchor rods may be threaded allowing for attachment of a nut thereto. Subsequent to lowering the base flange, it may be fixated by e.g. attaching a nut to each of the anchor rods above the base flange, thus applying tension on the anchor rods.

The tower construction may comprise a shield surrounding the concrete element, thus the method may further comprise a step of applying a substantially horizontal pressure on the concrete element, i.e. a pressure essentially directed from the periphery of the concrete element towards the centre of the concrete element, by tightening the shield.

BRIEF DESCRIPTION OF THE DRAWINGS

Embodiments of the invention will now be further described with reference to the drawings, in which.

DETAILED DESCRIPTION OF THE DRAWINGS

Figure 1:
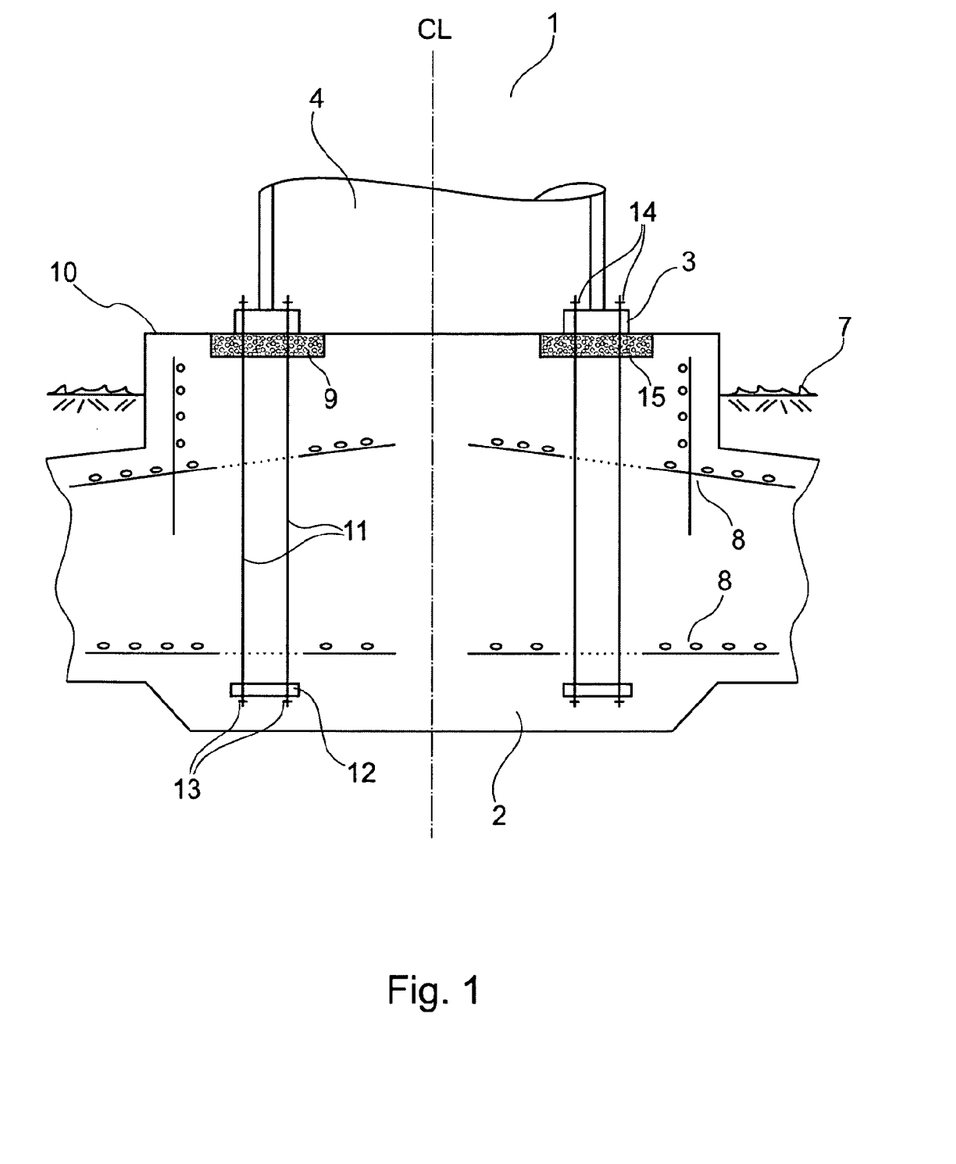
FIG. 1 illustrates a cross-section of a tower construction.

FIG. 1 illustrates an embodiment of a tower construction 1 which comprises a concrete element 2 and a base flange 3 comprising a lower surface and an opposite upper surface. The concrete element 2 is substantially rotationally symmetrical about the centre line CL. A tower wall 4 extends from the upper surface of the base flange 3. The base flange 3 is supported by an embodiment of an intermediate support structure 5 (see FIGS. 3A, 3B, 4A and 4B) positioned on the concrete element 2. The illustrated support structure 5 is more rigid than the concrete element 2, and therefore deforms less than the concrete element 2, when an equal pressure is applied hereon. Furthermore the support structure 5 comprises a resilient pressure distributing element 6 (see FIGS. 3A, 3B, 4A and 4B) which is soft relative to the concrete element 2, thus the resilient pressure distributing element 6 deforms more than the concrete element 2, when being exposed to equal pressure.

The concrete element 2 is cast in a pit in the ground 7 and comprises a steel reinforcement 8. A groove 9 is formed in the upper mounting plane 10 of the concrete element, in which groove 9 the intermediate support structure 5 is positioned. See FIG. 2 for an enlargement of the groove 9 and the position of the base flange 3.

As illustrated in FIG. 1, the concrete element 2 also comprises a plurality of anchor rods 11 and an anchor ring 12. The anchor rods 11 are elongated high strength steel rods being substantially vertically arranged in and spaced about the centre of the concrete element 2. The anchor ring 12 is a steel flange comprising a plurality of through holes which enable connection of the anchor rods 11 to the anchor ring 12. The anchor ring 12 is positioned near the bottom of the concrete element 2, thus the anchor ring 12 is connected to the lower end of the anchor rods 11. The lower part of the anchor rods 11 is threaded and the connection of the anchor rods 11 to the anchor ring 12 is secured by attaching a nut 13 to each of the anchor rods 11 below the anchor ring 12. The upper section of the anchor rods 11 extends through the upper mounting plane 10 of the concrete element 2.

The anchor rods 11 are spaced in pairs side-by-side forming two rings about the centre of the concrete element 2, the inner ring of anchor rods 11 having a slightly shorter diameter than the outer ring of anchor rods 11. The anchor ring 12 comprises two sets of though holes spaced about the centre of the anchor ring 12, these through holes forming two rings.

In order to fixate the tower wall 4 to the concrete element 2, the base flange 3 comprises a plurality of through holes extending from the upper to the lower surface. Thus when positioning a tower wall 4, the anchor rods 11 extend through these holes. The upper part of the anchor rods is threaded allowing for attachment of the nut 14 thereto. Subsequent to positioning the tower wall 4, it is fixated by attaching the nuts 14 to the anchor rods 11 above the base flange 3, thereby applying tension on the anchor rods 11.

The anchor rods 11 comprise a surface treatment (not shown) which allows for tensioning the anchor rods 11 with substantially no frictional forces affecting the concrete element 2. The surface treatment is a coating allowing the anchor rods 11 to stretch under tension essentially without interacting with the concrete element 2.

Figure 2:
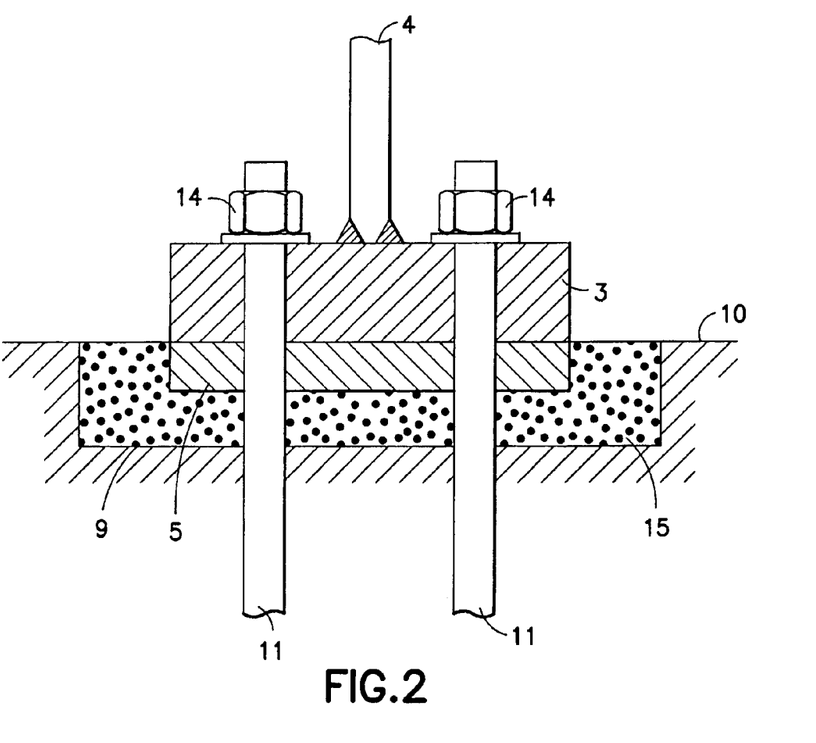
FIG. 2 illustrates an enlarged part of FIG. 1.

As illustrated in FIGS. 1 and 2, a second casting layer 15 is located between the concrete element 2 and the base flange 3. This second casting layer 15 is provided to distribute a pressure on the illustrated support structure 5 to the concrete element 2. The support structure 5 is not shown in these figures, since it is embedded in the second casting layer 15. In order to allow for an even distribution of the pressure to which the support structure 5 is exposed, the rigidity of the illustrated support structure 5 (see FIGS. 3 and 4) is in the range of the rigidity of the second casting layer 15, i.e. the support structure 5 and the second casting layer 15 deform at approximately equal pressures. Removal of the support structure 5 and subsequent casting in cavities which may occur after such a removal are therefore unnecessary, thus the second casting layer 15 can be cast in one work sequence.

Figure 3A:
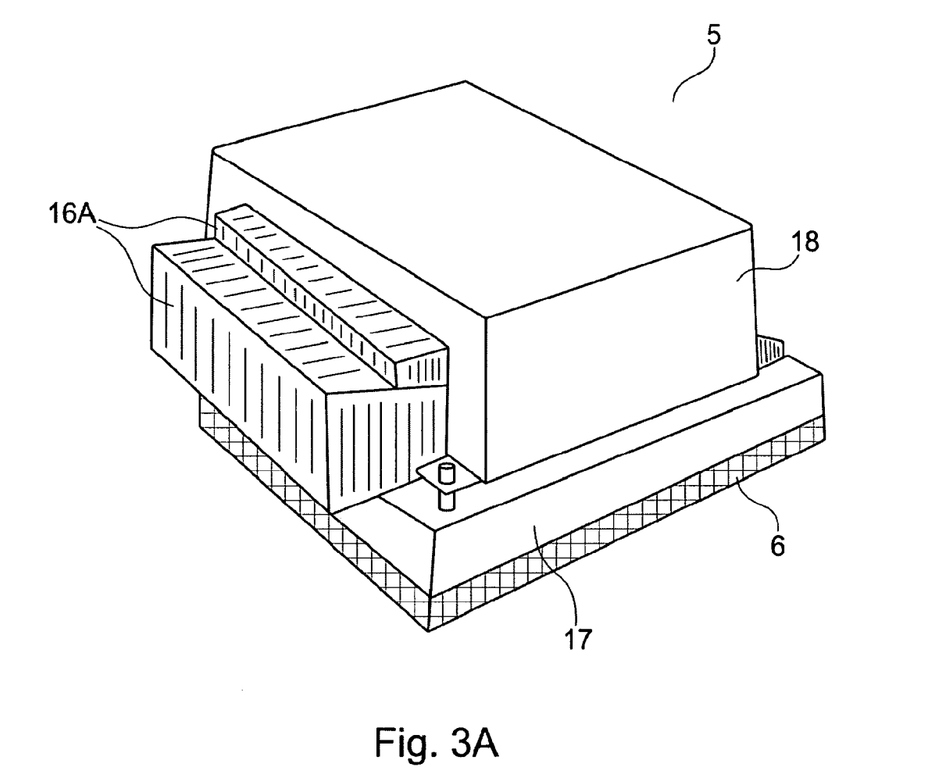
FIG. 3A illustrates a support structure.
Figure 3B:
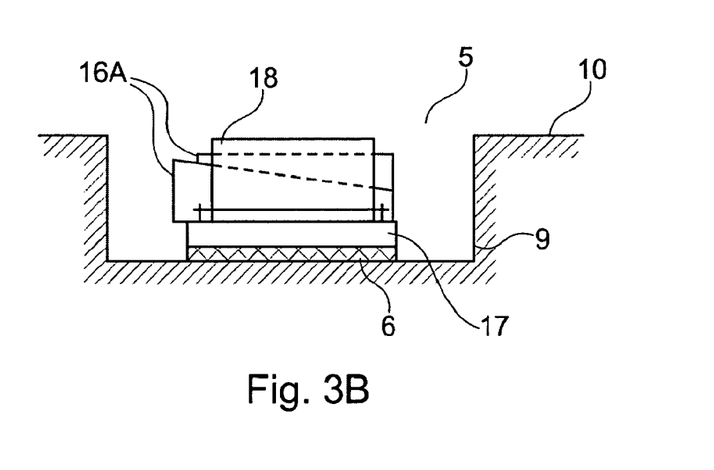
FIG. 3B illustrates a cross-section of the support structure of FIG. 3A.
Figure 4A:
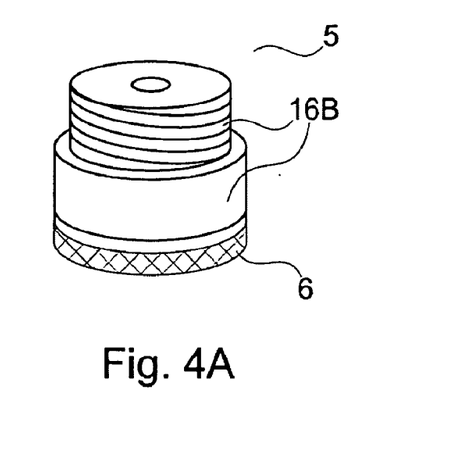
FIG. 4A illustrates a support structure.
Figure 4B:
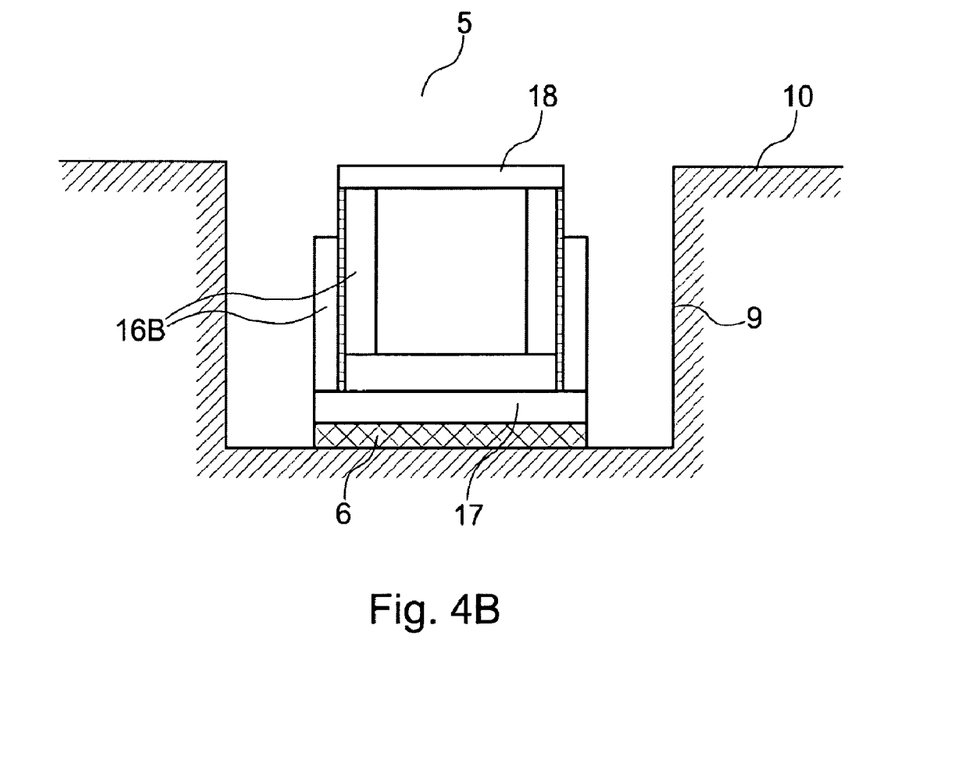
FIG. 4B illustrates a cross-section of the support structure of FIG. 4A.

FIGS. 3 and 4 illustrate two different embodiments of a support structure 5 according to the invention. The support structure 5 comprises a pressure distributing element 6 in the form of a plastic layer. Furthermore, the support structure 5 comprises a levelling structure 16 (A or B) in order to be able to level the base flange 3 relative to the concrete element 2. The levelling structure 16 is located between the lower surface of the base flange 3 and the pressure distributing element 6.

In the embodiment shown in FIGS. 3A and 3B, the levelling structure comprises two steel wedges 16A which are provided to adjust a distance between the concrete element 2 and the base flange 3, thereby levelling the base flange 3. The two steel wedges 16A are positioned on top of each other, so that a direction from a blunt end to a pointed end of one wedge is opposite to that of the other wedge, in order to be able to slide the wedges 16A relative to each other until the required height of the support structure 5 is achieved. The levelling structure 5 further comprises a steel base 17 and a steel top 18 attached to each other in order to lock the wedges 16A together when these are adjusted to the required height.

FIGS. 4A and 4B show another embodiment of a support structure 5. The levelling structure comprises two telescopically arranged carrier rods 16B, the carried rods 16B being provided to adjust the distance between the concrete element 2 and the base flange 3. The carrier rods 16B are threaded rods, one being internally threaded and the other being externally threaded in order to arrange them telescopically. A steel base 17 and a steel top 18 are provided in order to protect the carrier rods 16B.

In order to level the base flange 3 relative to the concrete element 2, the support structure 5 comprises three individually height adjustable support elements. When these are in level, the base flange 3 including the tower wall 4 is positioned, and the second casting layer 15 is cast in the groove 9. When the second casting layer 15 has hardened, the nuts 14 are tightened and tension is applied on the anchor rods 11.

Figure 7:
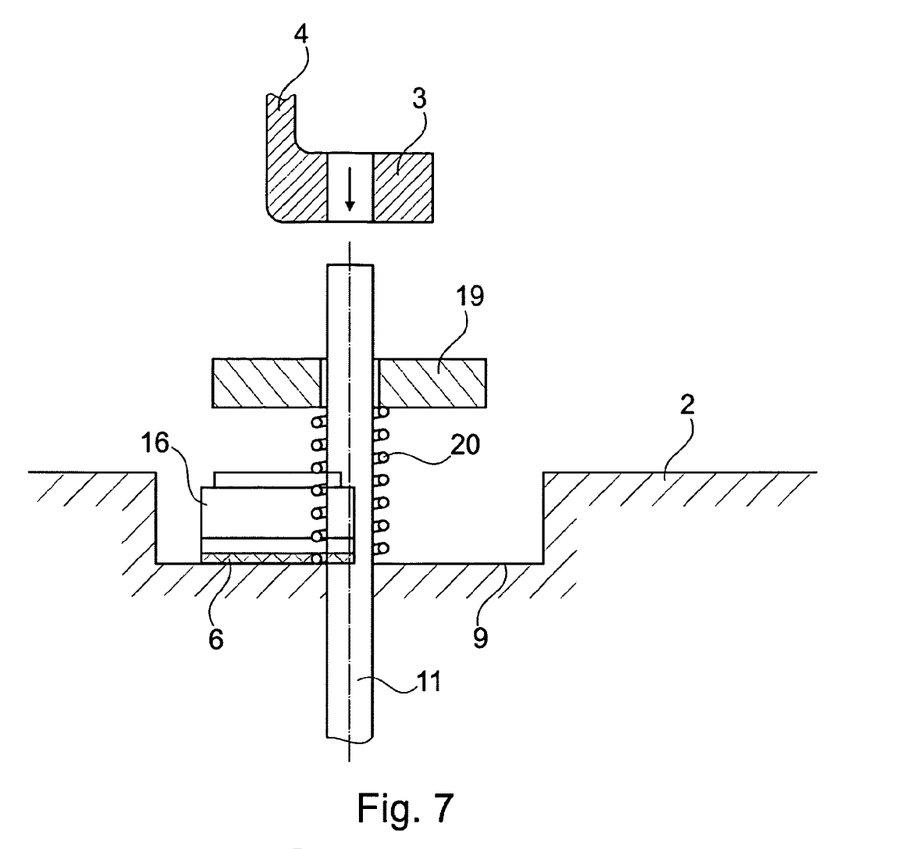
FIG. 7 illustrates FIG. 6 in a non-connected state.
Figure 8:
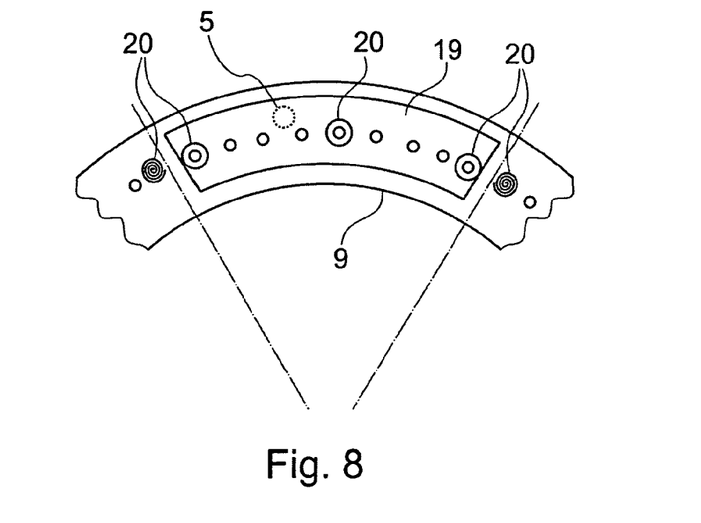
FIG. 8 illustrates a part of the support structure of FIG. 5.

In an alternative embodiment illustrated in FIGS. 5-8, the support structure further comprises an additional pressure distributing structure (see FIGS. 7 and 8 for more details).

Figure 5:
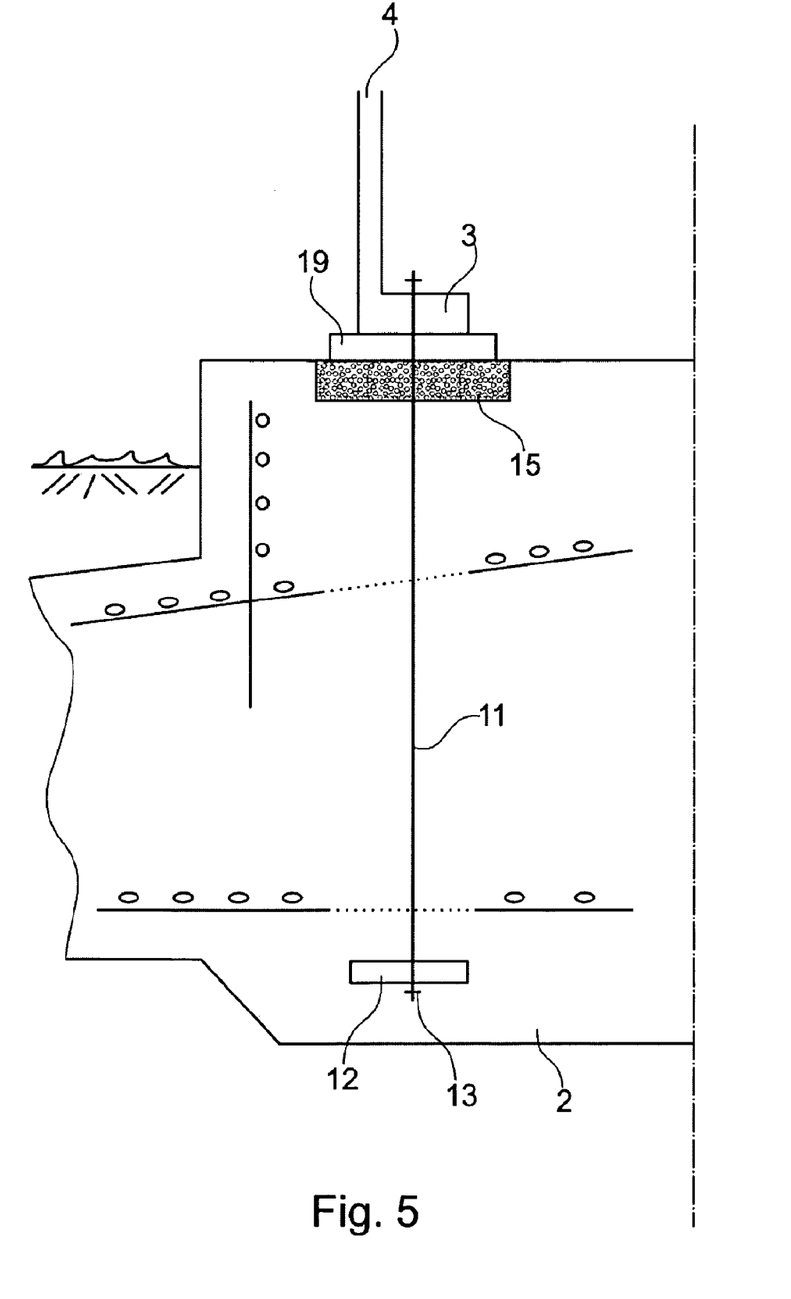
FIG. 5 illustrates a cross-section of a tower construction.
Figure 6:
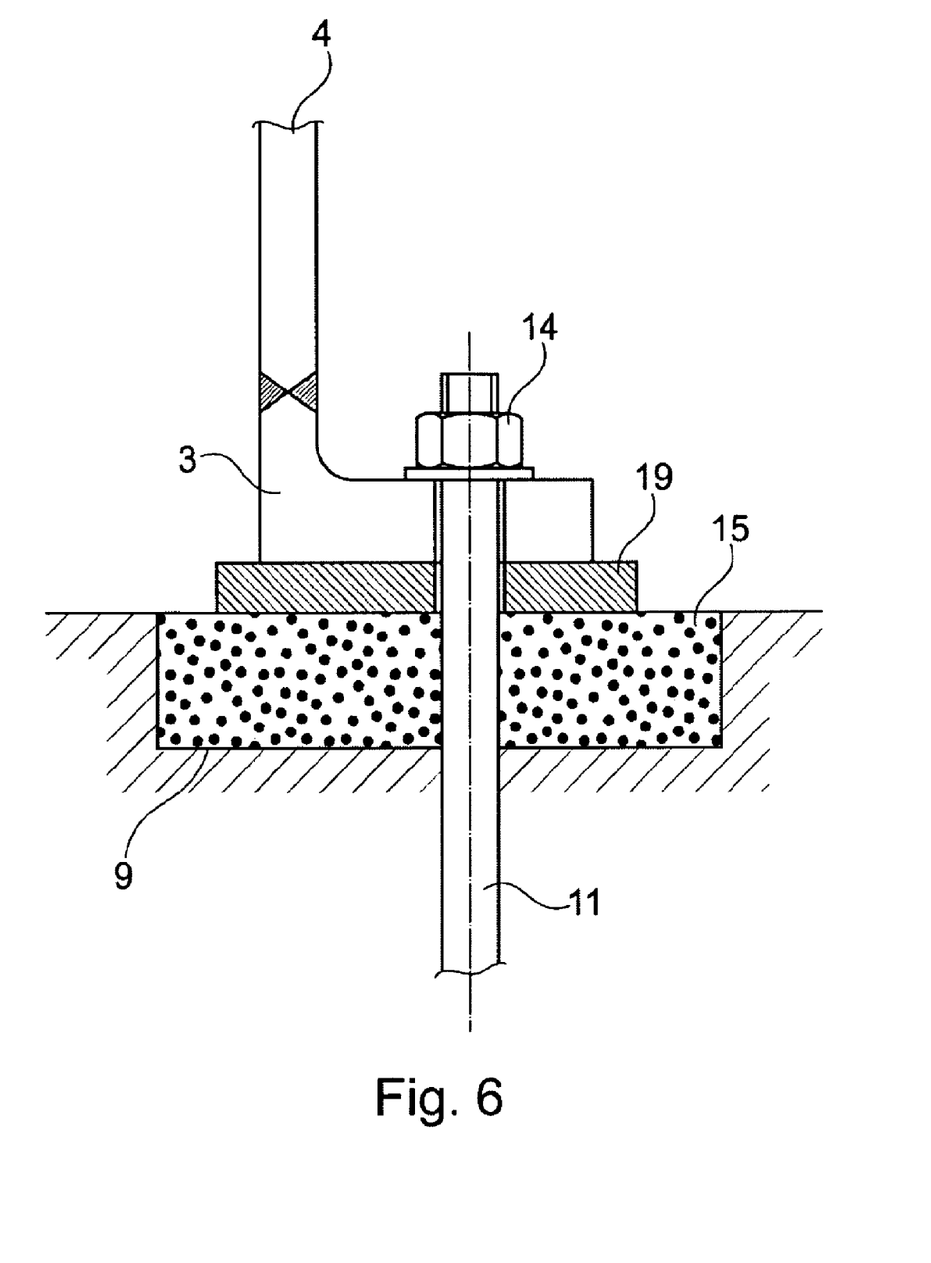
FIG. 6 illustrates an enlarged part of FIG. 5.

The tower construction 1 illustrated in FIG. 5 is substantially rotationally symmetrical around the centre line CL and comprises a plurality of anchor rods 11 and an anchor ring 12. The anchor rods 11 and the anchor ring 12 are similar to the rods 11 and the ring 12 of the above-described tower construction 1. Though in this embodiment, the anchor rods 11 form only one ring about the centre of the concrete element 2. Compared to the embodiment shown in FIGS. 1 and 2, the tower wall 4 and the base flange 3 is L-shaped, whereas they in FIGS. 1 and 2 are T-shaped. The anchor rods 11 extend in this embodiment in the inner space of the tower.

In FIGS. 5-8, the illustrated embodiment of the support structure furthermore comprises an additional pressure distributing structure in the form of a number of pressure distributing plates 19 and a number of springs 20. As illustrated in FIG. 8, the tower construction comprises three springs 20 per pressure distributing plate 19, thus facilitating biasing of the plates 19 towards the base flange 3. In the illustrated embodiment, a number of six pressure distributing plates 19 is applied. Only one pressure distributing plate is shown in FIG. 8, since only a sector of the groove 9 and the pressure distributing plates 19 are shown. Thus, this alternative embodiment of the support structure comprises six pressure distributing plates 19, eighteen springs 20 and a combination of a resilient pressure distributing element 6 and a levelling structure 16. The two latter being equal to the simple embodiment of the support structure 5 as illustrated in FIGS. 3 and 4.

The positioning of the tower wall 4 on the concrete element 2 is illustrated in FIG. 7. In order to level the base flange 3 relative to the concrete element 2, three individually height adjustable support elements, each comprising a resilient pressure distributing element 6 and a levelling structure 16 is positioned in the groove 9. When these are in level, the springs 20 are positioned. A number of three springs 20 per pressure distributing plate 19 is applied. Subsequently, the six pressure distributing plates 19 are positioned on the springs 20. Hereafter, the base flange 3 including the tower wall 4 is positioned, and the springs 20 bias the pressure distributing plates 19 towards the base flange 3. This may ensure that no air bubbles are present. Finally, the second casting layer 15 is cast in the groove 9. When the second casting layer 15 has hardened, the nuts 14 are tightened and tension is applied on the anchor rods 11.

Figure 9:
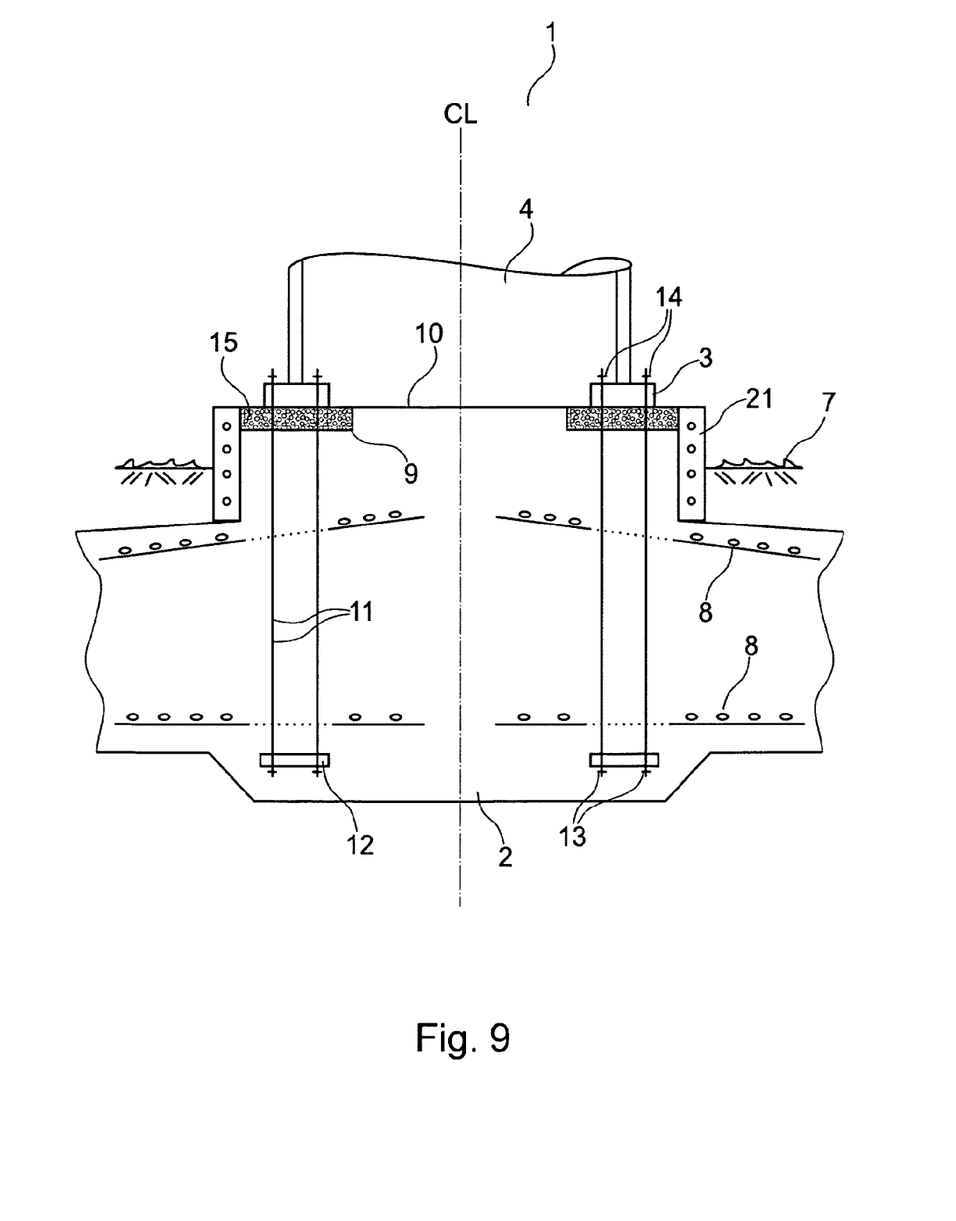
FIG. 9 illustrates a cross-section of a tower construction.

FIG. 9 illustrates a third embodiment of the invention further comprising a shield 21 surrounding an upper portion of the concrete element 2. The shield 21 is provided to apply a substantially horizontal pressure on the concrete element 2, i.e. a pressure essentially directed from the periphery of the concrete element 2 towards the centre hereof. When positioning the base flange 3 on the support structure 5, a pressure is applied on the concrete element 2 which may be protected against cracking by the shield 21.

Furthermore, when applying tension on the anchor rods 11, a substantially vertical pressure is applied on the concrete element 2 which consequently expands horizontally, and thereby is being radially deformed. By applying a horizontal pressure radially on the concrete element 2, the deformation can be avoided, and the concrete element 2 is essentially purely exposed to compressive stress. This also has the advantage, that cracking of the concrete element 2 can be avoided or substantially reduced.

Figure 10A:
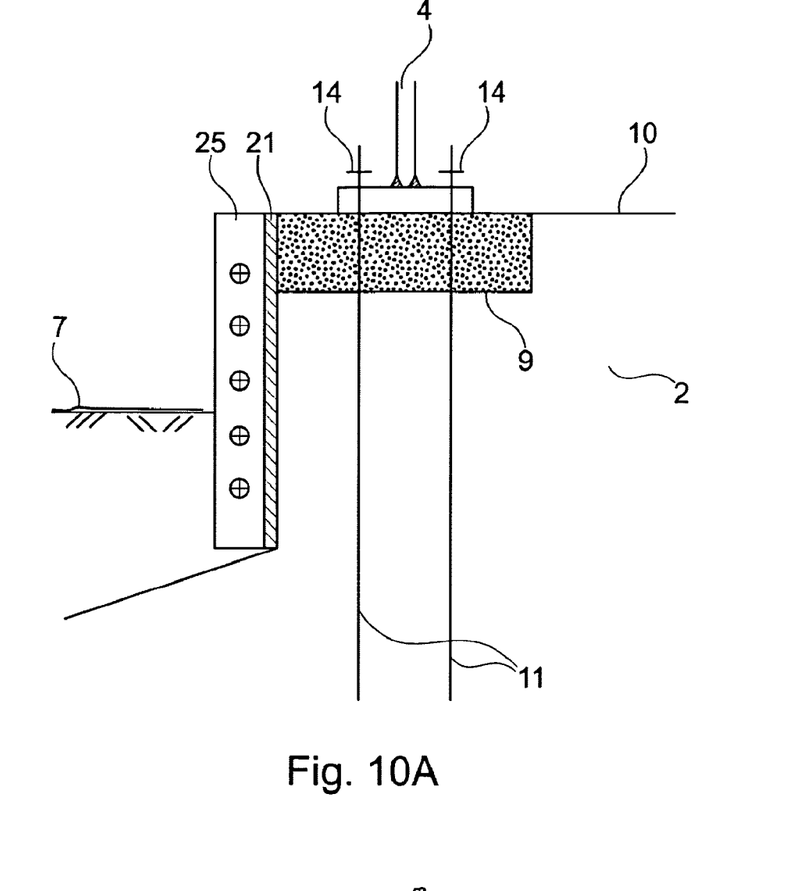
FIG. 10A illustrates an enlarged part of FIG. 5 illustrating a shield.
Figure 10B:
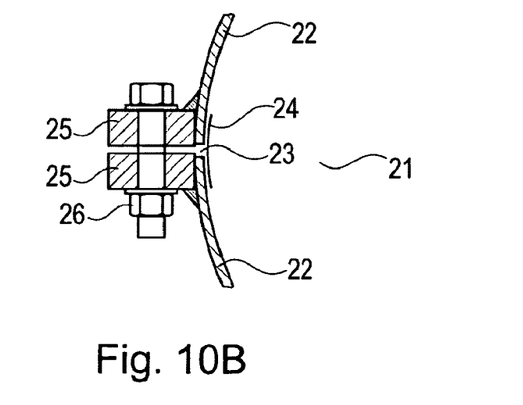
FIG. 10B illustrates a cross-section of the shield of FIG. 6A.

FIGS. 10A and 10B illustrate a detail of a shied 21 according to the invention. The shield 21 comprises two substantially half circular plates 22 defining two openings 23 each being sealed by a sealing element 24. The size of the openings 23 is variable, and variation of the size varies the pressure applied on the concrete element, since variation of the size varies the circumference of the shield 21. At each opening, a set of flanges 25 extends outwardly and the substantially horizontal pressure is applied by pressing these flanges 25 forcibly together by application of a bolt and nuts assembly 26 positioned at through holes of the flanges 25.

The sealing element 24 is positioned between the concrete element 2 and the shield 21. When casting the concrete element 2, liquid concrete is poured into a form, and therefore the sealing element 24 is used to protect the openings 23.

The invention claimed is:

1. A tower construction comprising:
    a concrete element;
    a base flange comprising a lower surface and an opposite upper surface from which a tower wall extends upwardly, the base flange being supported by an intermediate support structure positioned on the concrete element, the support structure being more rigid than the concrete element; and
    a second casting layer located between the concrete element and the base flange, the second casting layer being provided to distribute a pressure on the support structure to the concrete element;
    the support structure comprising a resilient pressure distributing element and a levelling structure being located between the lower surface and the pressure distributing element, the resilient pressure distribution element being soft relative to the concrete element and the levelling structure being provided to level the base flange relative to the concrete element,
    wherein the rigidity of the combination of the resilient pressure distributing element and the levelling structure is in the range of the rigidity of the second casting layer.

2. The tower construction according to claim 1, wherein the support structure further comprises an additional pressure distributing structure.

3. The tower construction according to claim 2, wherein the additional pressure distributing structure comprises a plurality of pressure distributing plates and a plurality of spring structures, the spring structures being provided to bias the pressure distributing plates towards the base flange.

4. The tower construction according to claim 1, wherein the levelling structure comprises a plurality of wedges, the wedges being provided to adjust a distance between the concrete element and the base flange.

5. The tower construction according to claim 1, wherein the levelling structure comprises at least two telescopically arranged carrier rods, the rods being provided to adjust a distance between the concrete element and the base flange.

6. The tower construction according to claim 1, wherein the support structure comprises a plurality of support elements having a height being individually adjustable.

7. The tower construction according to claim 1, wherein the concrete element comprises a plurality of anchor rods and an anchor ring, the anchors rods being substantially vertically arranged and an upper section thereof extending through the concrete element, the anchor rods and the anchor ring being connected at a lower end of the anchor rods.

8. The tower construction according to claim 1, wherein the base flange comprises a plurality of through holes extending from the upper to the lower surface, the rods extending through the holes.

9. The tower construction according to claim 1 further comprising a shield surrounding an upper portion of the concrete element, the shield being provided to apply a substantially horizontal pressure on the concrete element.

10. A method of laying a foundation of a tower construction which comprises a base flange with a lower surface and an opposite upper surface, from which a tower wall extends upwardly, the method comprising the steps of:
    casting a concrete element;
    providing an intermediate support structure being more rigid than the concrete element, the support structure comprising a resilient pressure distributing element and a levelling structure, the resilient pressure distributing element being soft relative to the concrete element;
    arranging the support structure on an upper mounting plane of the concrete element;
    lowering the base flange onto the support structure;
    levelling the base flange relative to the concrete element;
    arranging a second casting layer between the concrete element and the base flange, the rigidity of the combination of the resilient pressure distributing element and the levelling structure being in the range of the rigidity of the second casting layer; and
    fixating the base flange to the concrete element.

11. The method according to claim 10, further comprising a step of providing the support structure with an additional pressure distributing structure.

12. The method according to claim 10, wherein the second casting layer is cast before fixating the base flange to the concrete element.

13. The method according to any of claim 10, wherein the second casting layer is cast in one work sequence.

14. The method according to claim 10, wherein the concrete element comprises a plurality of anchor rods, and wherein the step of fixating the base flange comprises a step of applying tension on the anchor rods.

15. The method according to claim 10, wherein the tower construction further comprises a shield surrounding the concrete element, the method further comprising a step of applying a substantially horizontal pressure on the concrete element by tightening the shield.

* * * * *